(12) United States Patent
Yim (10) Patent No.: US 6,452,969 B1
(45) Date of Patent: Sep. 17, 2002

(54) TRANSFORM DOMAIN INVERSE MOTION COMPENSATION HAVING FRACTIONAL PEL ACCURACY

(75) Inventor: Changhoon Yim, Edison, NJ (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/162,302

(22) Filed: Sep. 28, 1998

(51) Int. Cl.$^7$ ................................................. H04B 1/66
(52) U.S. Cl. ................................................. 375/240.02
(58) Field of Search ........................... 348/400.1–416.1, 348/845.1, 845.2, 845.3; 382/232, 236; 375/240.02, 240.16, 240.09, 240.1, 240.11, 240.12, 240.13, 240.14, 240.15, 240.17; H04B 1/66

(56) References Cited

U.S. PATENT DOCUMENTS

| | | | | |
|---|---|---|---|---|
| 5,408,274 A | * | 4/1995 | Chang et al. | 348/700 |
| 5,412,428 A | * | 5/1995 | Tahara | 348/396 |
| 5,708,732 A | * | 1/1998 | Merhav et al. | 382/232 |
| 5,764,553 A | * | 6/1998 | Hong | 364/725.01 |
| 5,941,938 A | * | 8/1999 | Thayer | 708/490 |
| 6,115,070 A | * | 9/2000 | Song et al. | 348/402 |

OTHER PUBLICATIONS

Young et al, Frequency–Domain Motion Estimation Using a Complex Lapped Transform, IEEE Transactions on Image Processing. vol. 2. No. 1, Jan. 1993.*
Chang et al, Manipulation and Compositing of MC–DCT Compressed Video, IEEE vol. 13. No. 1, Jan. 1995.*
Ito et al, On Motion Compensation of Wavelet Coefficienct, IEEE, pp. 2161–2163, Jan. 1995.*

* cited by examiner

Primary Examiner—Chris Kelley
Assistant Examiner—Tung Vo
(74) Attorney, Agent, or Firm—Joseph S. Tripoli; Ronald H. Kurdyla; Guy H. Eriksen (57) ABSTRACT

A video editing system for editing a compressed video stream in the transform domain reconstructs frames of video signal that have been motion compensated predictive encoded on a block basis. Spatial translations of blocks are determined from motion vectors and shifting matrices are generated with subpixel resolution from the translation data. The shifting matrices are applied to respective blocks and reconstructed blocks are formed from transform domain prediction blocks and transform domain prediction error blocks.

13 Claims, 6 Drawing Sheets

TARGET VIDEO FRAME

REFERENCE VIDEO FRAME

TRANSFORM DOMAIN INVERSE MOTION COMPENSATION HAVING FRACTIONAL PEL ACCURACY

GOVERNMENT LICENSE

The U.S. Government has a paid-up license in this invention and the right in limited circumstances to require the patent owner to license others on reasonable terms as provided for by the terms of Government Contract No. 70NANB5H1174 awarded by NIST (National Institute of Standards & Technology).

FIELD OF THE INVENTION

The present invention relates to reconstructing motion compensated images, and more particularly, to constructing a motion compensated block with fractional pel accuracy in a transform domain.

BACKGROUND OF THE INVENTION

Video data is commonly compressed utilizing well known compression standards such as JPEG, MPEG-1, MPEG-2, and H.261. In order to obtain a compressed representation of the video data, these compression standards utilize intraframe coding techniques in order to exploit spatial redundancies often found within a single frame of video. A common intraframe coding technique employs a block-based two-dimensional transform that transforms each frame of video data from a spatial domain to a transform domain. One common intraframe coding technique first divides a video frame into 8×8 blocks of pels, and independently applies a two-dimensional discrete cosine transform (DCT) to each pel block. This operation results in an 8×8 block of DCT coefficients in which most of the energy in the original pel block is typically concentrated in a few low-frequency coefficients. The 8×8 block of DCT coefficients is then quantized and variable length encoded in order to reduce the number of bits necessary to represent the original 8×8 pel block.

Figure 1:
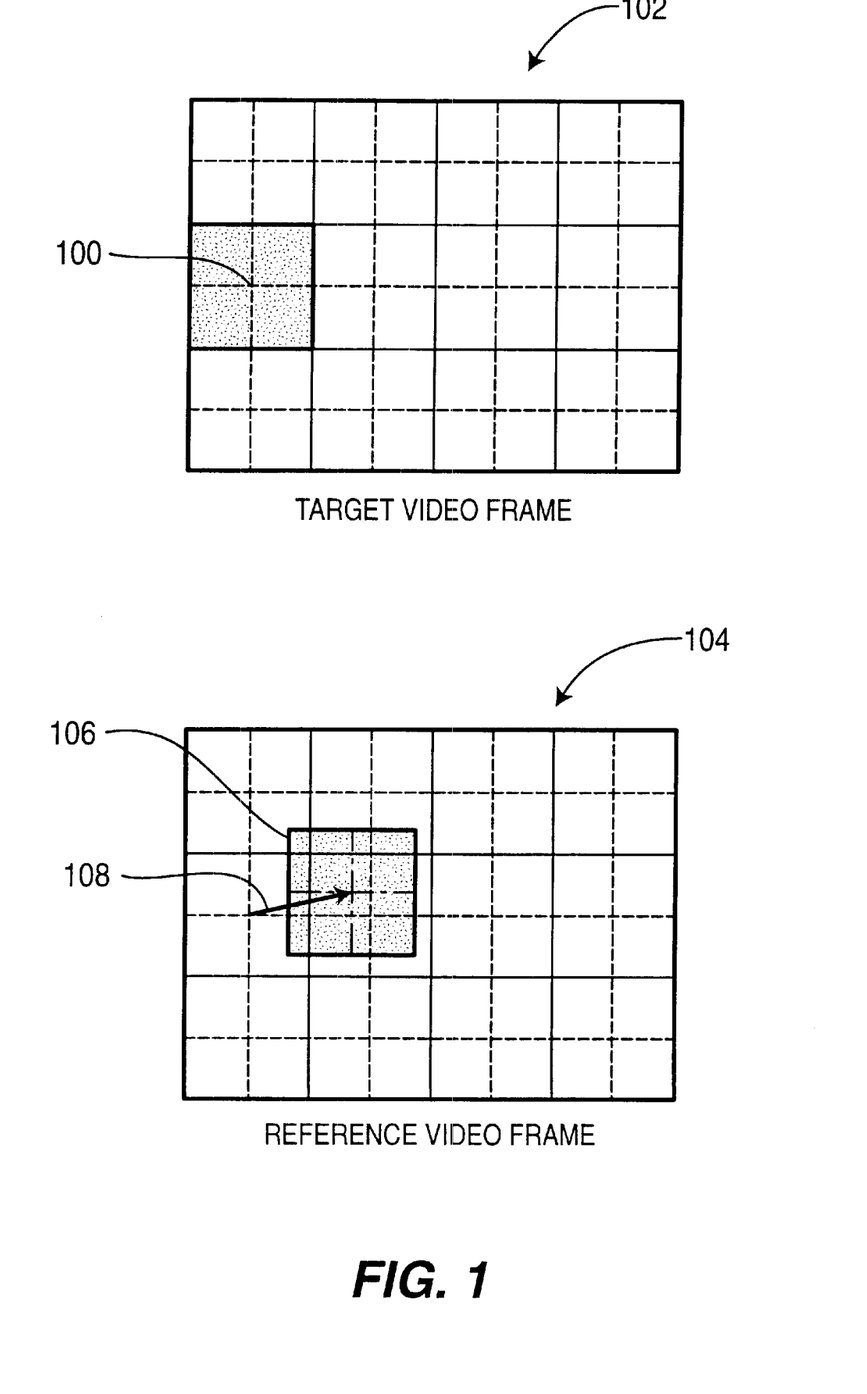
FIG. 1 illustrates unidirectional motion compensation used by an interframe encoding technique.

Moreover, compression standards, such as MPEG-1, MPEG-2, and H.261, utilize interframe coding techniques in order to exploit temporal redundancies often found between temporally adjacent video frames. These compression standards exploit temporal redundancy by computing an interframe difference signal called "prediction error." In computing the prediction error, the technique of motion compensation is employed to correct the prediction for motion. Reference is made to FIG. 1 in order to illustrate unidirectional motion estimation which is also known as "forward prediction." In forward prediction, a target macroblock 100 of a video frame 102 to be encoded is matched with pel blocks of the same size in a past video frame 104 called the "reference video frame." The pel block in the reference video frame 104 that best matches the target macroblock 100 is selected for use as a prediction macroblock 106. After selecting the prediction macroblock 106, a prediction error macroblock is computed as the difference between the target macroblock 100 and the prediction macroblock 106. The prediction error macroblock is then encoded utilizing the two-dimensional DCT encoding technique described above.

The position of the prediction macroblock 106 is indicated by a motion vector 108 that indicates a horizontal and vertical pel displacement between the target macroblock 100 and the prediction macroblock 106. The motion vector 108 is then encoded for transmission along with the encoded prediction error macroblock.

Figure 2:
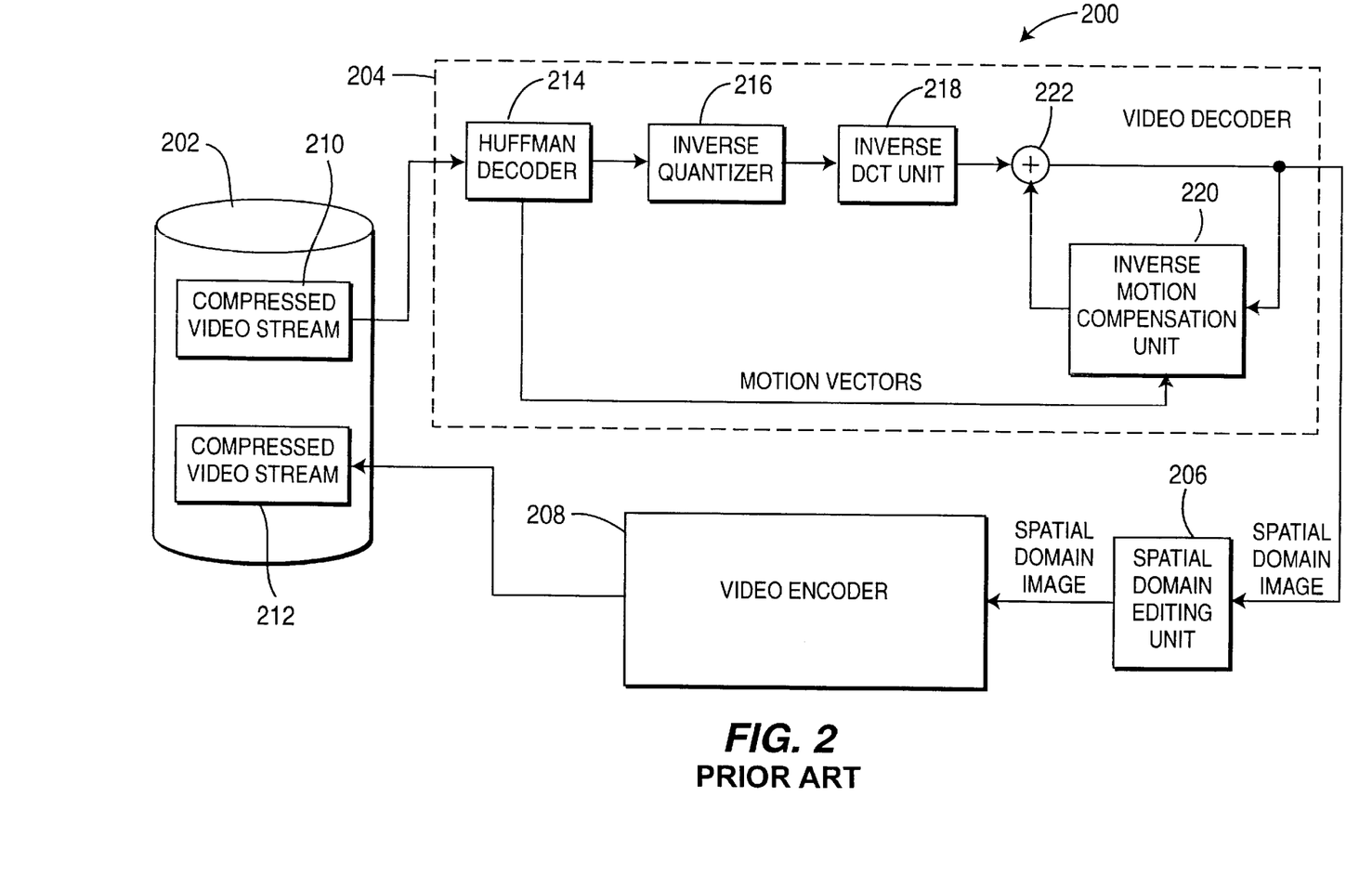
FIG. 2 shows a block diagram of a known video editing system which edits a compressed video stream in the spatial domain.

FIG. 2 depicts a block diagram of a prior art video editing system 200 that utilizes a traditional approach for editing video compressed in accord with the MPEG-2 standard. The video editing system 200 essentially decompresses the video stream to obtain the video stream in the spatial domain, edits the decompressed video stream in the spatial domain, and compresses the edited video stream in order to place the edited video stream back into the compressed domain.

Performing image manipulation techniques such as resizing, transcoding, and compositing are relatively straight forward in the spatial domain since the goal of these editing techniques are to alter the spatial domain appearance of video frames. For example, resizing video frames of a video stream in the spatial domain involves downsampling the pels of each video frame in order to reduce the spatial resolution of each video frame. In other words, in order to reduce the spatial resolution of each 720×480 video frame of a video stream to a 360×240 video frame in the spatial domain, the video editing system 200 may average each two by two block of pels to obtain a single pel. While the video editing system 200 is relatively intuitive implementation of a compressed video editing system, the video editing system 200 is also computationally intensive due to (1) the high computational complexity of the decompression and compression tasks, and (2) the large volume of spatial domain data that has to be manipulated. Due to the computational complexity of the video editing system 200, the hardware required to implement the video editing system 200 may be costly.

For this reason there has been a great effort in recent years to develop fast algorithms that perform these video editing techniques directly in the compressed domain and thereby avoid the need of completely decompressing the video stream. One such example is U.S. Pat. No. 5,708,732 to Merhav et al., entitled Fast DCT Domain Downsampling and Inverse Motion Compensation, which is hereinafter referred to as the "Merhav patent". The Merhav patent discloses a method of inverse motion compensating in the DCT domain. In particular, the Merhav patent discloses inverse motion compensating in the DCT domain with integer pel accuracy. In other words, the Merhav patent discloses a method of inverse motion compensating in the DCT domain based upon a motion vector that indicates integer pel displacements in both the vertical and horizontal directions.

However, one drawback of the method described in the Merhav patent arises from the method being limited to inverse motion compensating with integer pel accuracy. Such a limitation is a drawback because both the MPEG-1 and MPEG-2 standards utilize motion vectors that are computed to the nearest half pel of displacement, using bilinear interpolation to obtain brightness values between pels. As a result, the method of the Merhav patent when applied to MPEG-1 and MPEG-2 video, would likely result in an edited MPEG video stream that contains undesirable visible artifacts due to the method disclosed in the Merhav patent not taking into account motion vectors computed to the nearest half pel of displacement.

Accordingly, since MPEG video utilizes motion vectors computed with half pel accuracy, there is still a need for transform domain inverse motion compensation having fractional pel accuracy.

SUMMARY OF THE INVENTION

The present invention fulfills the above need, as well as others, by providing a partial video decoder that inverse motion compensates interframe encoded frames in a transform domain with fractional pel accuracy. In general, the partial video decoder partially decodes a compressed video stream in order to obtain a transform domain representation of the video stream. In obtaining the transform domain representation of the video stream, the partial video decoder reconstructs frames that have been encoded based upon other frames (i.e. reference frames) of the video stream. In particular, the partial video decoder constructs transform domain target blocks of a video frame based upon transform domain prediction blocks and transform domain prediction error blocks. In order to obtain the transform domain prediction block, the partial video decoder inverse motion compensates transform domain reference blocks of a reference frame. To this end, the partial video decoder applies shifting and windowing matrices to the transform domain reference blocks which shift the transform domain reference blocks by fractional pel amounts. By utilizing the shifting and windowing matrices that account for fractional pel displacements, the partial video decoder inverse motion compensates the transform domain reference blocks without introducing undesirable artifacts that would otherwise arise if integer pel shifting and windowing matrices were utilized.

An exemplary method according to the present invention is a method of constructing a transform domain target block. One step of the method includes the step of obtaining a first displacement value. Another step of the method includes the step of determining whether the first displacement value indicates a first fractional pel displacement between a pel target block of a target image and a pel prediction block of a reference image. The method also includes the step of constructing a transform domain prediction block in the transform domain based upon a transform domain representation of the reference image. The constructing step of the method includes the step of shifting a transform domain reference block of the transform domain representation by a first fractional pel amount that is based upon the first fractional pel displacement, if the determining step determines that the first displacement value indicates the first fractional pel displacement. The method also includes the step of constructing the transform domain target block based upon the transform domain prediction block and a transform domain prediction error block that represents a pel difference between the pel target block and the pel prediction block.

The present invention further includes various apparatus for carrying out the above method. For example, one apparatus according to the present invention includes a decoding circuit, an inverse motion compensation unit, and an adding circuit. The decoding circuit is operable to receive a compressed video stream. The decoding circuit is also operable to obtain from the compressed video stream, a transform domain prediction error block that represents in a transform domain a pel difference between a pel target block of a target video frame and a pel prediction block of a reference video frame. Moreover, the decoding circuit is operable to obtain from the compressed video stream a motion vector that represents a first fractional pel displacement between the pel target block and the pel prediction block.

The inverse motion compensation unit is coupled to the decoding circuit and is operable to receive the motion vector. The inverse motion compensation unit is also operable to obtain a transform domain prediction block from a transform domain reference video frame that represents the reference video frame in the transform domain. In particular, the inverse motion compensation unit is operable to obtain the transform domain prediction block by shifting a transform domain reference block of the transform domain reference video frame, a fractional pel amount based upon the first fractional pel displacement.

The adding circuit is coupled to the decoding circuit and the inverse motion compensation unit. The adding circuit is operable to receive the transform domain prediction error block from the decoding circuit. The adding circuit is also operable to receive the transform domain prediction block from the inverse motion compensation unit. Moreover, the adding circuit is operable to combine the transform domain prediction error block and the transform domain prediction block in order to obtain a transform domain target block of a transform domain video stream.

The above features and advantages, as well as others, will become more readily apparent to those of ordinary skill in the art by reference to the following detailed description and accompanying drawings.

DETAILED DESCRIPTION
Video Imaging and MPEG-2 Video Compression

In order to better appreciate features of the present invention, video imaging and is MPEG-2 compression will be discussed in some detail. Video imaging comprises a sequence of still pictures of a scene taken at various subsequent intervals in time. These still pictures or video frames may be sampled to produce a grid of pels or picture elements that are representative of the distribution of light energy and wavelengths of the frame. In particular, the trichromatic theory of color vision implies that the perceived intensity of light which is made up of brightness, hue and saturation may be duplicated by an appropriate combination of three primary colors. Accordingly, each video frame may be represented by a grid of first primary color pels, second primary color pels, and third primary color pels.

Figure 3:
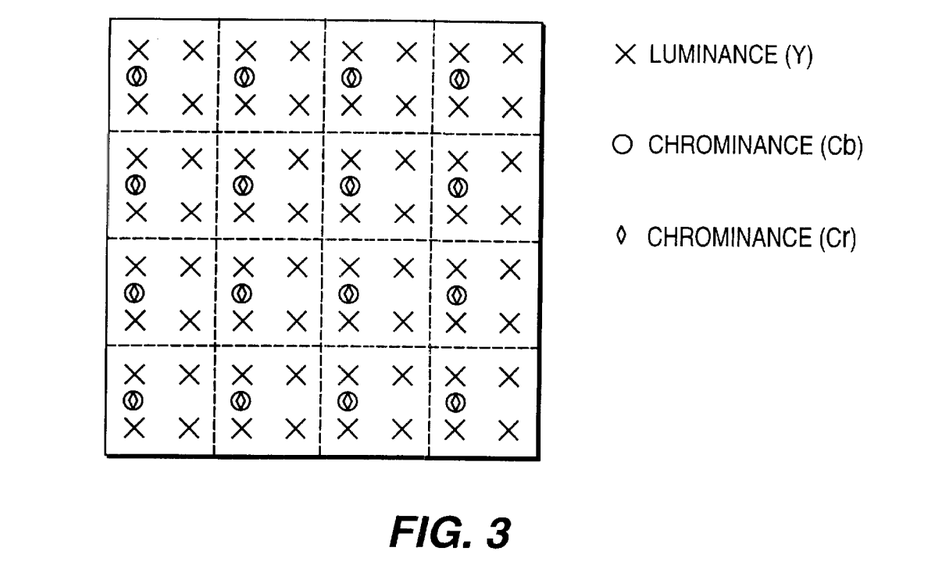
FIG. 3 illustrates the 4:2:0 chrominance sampling format used by MPEG-2 encoded video streams.

In accord with the trichromatic theory, the MPEG-2 standard utilizes luminance (Y) pels, first chrominance (Cb) pels, and second chrominance (Cr) pels for representing video images. Moreover, the Main Profile at the Main Level of MPEG-2 utilizes 4:2:0 chrominance sampling in order to take advantage of the human eyes sensitivity to luminance (Y) and lack of sensitivity to the two chrominances (Cb, Cr). A graphical representation of 4:2:0 chrominance sampling is shown in FIG. 3. As shown, each block of 2×2 luminance (Y) pels includes a single first chrominance (Cb) pel, and a single second chrominance (Cr) pel. In other words, the MPEG-2 4:2:0 format implements both 2:1 vertical subsampling of the chrominance (Ca,Cb), and 2:1 horizontal subsampling of the chrominance (Ca,Cb).

To achieve data compression, the MPEG-2 standard utilizes intraframe coding techniques in order to exploit spatial redundancies often found within a single video frame. In particular, MPEG-2 intraframe coding employs a block-based, two-dimensional transform that transforms each video frame from a spatial domain (i.e. a pel representation) to a transform domain (e.g. a frequency component representation). To this end, the MPEG-2 intraframe coding technique first divides a video frame into N×N blocks of pels, and independently applies a two-dimensional discrete cosine transform (DCT) to each pel block. In particular, the N×N 2D-DCT transform converts a pel block $\{x(n,m)\}$ in the spatial domain into a corresponding N×N matrix of frequency components $\{X(k,l)\}$ according to the following equation:

$$X(k, l) = \frac{c(k)}{2} \frac{c(l)}{2} \left[ \sum_{n=0}^{N-1} \sum_{m=0}^{N-1} x(n, m) \cos\left(\frac{(2n+1)}{2N} k\pi\right) \cos\left(\frac{(2m+1)}{2N} l\pi\right) \right] \quad (1)$$

where N=8 for an 8×8 2D-DCT transform, $c(0)=1/\sqrt{2}$, $c(k)=1$ for k>0, and $c(l)=1$ for l>0. Equation (1) may also be represented in a matrix form as follows:

$$X = S \times S^t \quad (2)$$

where $x=\{x(n,m)\}$, $X=\{X(k,l)\}$, $S^t$ is the transposition of matrix S, and $S=\{s(k,n)\}$, where:

$$s(k, n) = \frac{c(k)}{2} \cos\left(\frac{(2n+1)}{2N} k\pi\right) \quad (3)$$

The above transformation of an 8×8 pel block results in an 8×8 block of DCT coefficients in which most of the energy in the original pel block is typically concentrated in a few low-frequency coefficients. The MPEG-2 intraframe coding technique then quantizes and variable length encodes the frequency coefficients of the DCT block in order to reduce the number of bits used to represent the original 8×8 pel block.

In addition to the intraframe coding techniques discussed above, the MPEG-2 standard achieves additional data compression by utilizing interframe coding techniques in order to exploit temporal redundancies often found between temporally adjacent video frames. The MPEG-2 interframe coding technique exploits temporal redundancy by computing an interframe difference signal called "prediction error." In computing the prediction error, the technique of motion compensation is employed to correct the prediction for motion of an image between successive frames of the video stream. In particular, MPEG-2 interframe coding uses a macroblock approach for motion compensation, where a macroblock is defined as a 16×16 block of luminance (Y) pels. Since the MPEG-2 standard utilizes 4:2:0 chrominance sampling, each macroblock also includes a single 8×8 block of first chrominance (Cb) pels, and a single 8×8 block of second chrominance (Cr) pels.

FIG. 1 illustrate the concept behind motion compensation and, in particular, a type of unidirectional motion estimation which is also known as "forward prediction". In forward prediction, a target macroblock 100 of a video frame 102 to be encoded is matched with pel blocks of the same size in a past video frame 104 called the "reference video frame." In particular, the forward prediction technique attempts to locate the same image represented in the target macroblock 100 within a pel block of the reference video frame 104. In matching, the target macroblock 100 with pel blocks of the reference video frame 104, bilinear interpolation is used to obtain brightness values between the pels of the reference video frame 104. In this manner, MPEG-2 interframe coding may locate with fractional pel accuracy a pel block in the reference video frame 104 that best matches the target macroblock 100. The located pel block is then used as a prediction macroblock 106 which comprises four 8×8 luminance (Y) pel blocks, and one 8×8 first chrominance (Cb) pel block, and one 8×8 second chrominance (Cr) pel block. A prediction error macroblock is then computed as the difference between the target macroblock 100 and the prediction macroblock 106. The interframe coding technique then encodes the prediction error macroblock utilizing 8×8 2-D DCT encoding as described above.

The position of the prediction macroblock 106 is indicated by a motion vector 108 that indicates a horizontal and vertical displacement between the target macroblock 100 and the prediction macroblock 106 with half-pel accuracy. Using values of past motion vectors, a prediction motion vector is computed. Then, the difference between the motion vector 108 and the prediction motion vector is computed and encoded to be transmitted along with the encoded prediction error macroblock.

Prior Art Spatial Domain Video Editing System

While the above MPEG-2 intraframe and interframe coding typically greatly reduces the amount of storage necessary for storing a video stream, the above MPEG-2 intraframe and interframe coding also greatly complicates subsequent viewing and editing of the compressed video stream. The subsequent viewing and editing of the compressed video stream are complicated due to intensive computations required to decompress and recompress the video stream. For example, a traditional prior art video editing system 200 for editing an MPEG-2 video stream is shown in FIG. 2. Essentially, the prior art video editing system 200 decompresses an MPEG video stream, performs conventional spatial domain image manipulations upon the decompressed MPEG video stream, and compresses and stores the editing MPEG video stream for future access.

As shown in FIG. 2, the prior art video editing system 200 includes a disk 202, an MPEG-2 decoder 204, a spatial domain editing unit 206, and a MPEG-2 encoder 208. The MPEG-2 decoder 204 includes a Huffman decoder 214 and an inverse quantizer 216 that are operable to Huffman decode and dequantize, respectively, an MPEG-2 video stream 210. Moreover, the MPEG-2 decoder 204 includes a inverse DCT unit 218 which converts an 8×8 DCT block of frequency components $\{X(k,l)\}$ into a corresponding 8×8 pel block $\{x(n,m)\}$ in the spatial domain according to the following equation:

$$x(n, m) = \left[ \sum_{k=0}^{K-1} \sum_{l=0}^{K-1} \frac{c(k)}{2} \frac{c(l)}{2} X(k, l) \cos\left(\frac{(2n+1)k\pi}{16}\right) \cos\left(\frac{(2m+1)l\pi}{16}\right) \right] \quad (4)$$

where K=8 for 8×8 DCT decoding, $c(0)=1/\sqrt{2}$, $c(k)=1$ for k>0, and $c(l)=1$ for l>0. In particular, the inverse DCT unit 218 outputs (i) a spatial domain 8×8 pel block $\{x(n,m)\}$ if the DCT block $\{X(k,l)\}$ was the result of intraframe encoding, or (ii) a spatial domain 8×8 prediction block if the DCT block $\{X(k,l)\}$ was the result of interframe encoding. Accordingly, in order to decode a single MPEG-2 4:2:0 macroblock, the inverse DCT unit 218 must convert four 8×8 luminance (Y) DCT blocks, one 8×8 first chrominance (Cb) DCT block, and one 8×8 second chrominance (Cr) DCT block.

The MPEG-2 decoder 204 also includes an inverse motion compensation unit 220 which inverse motion compensates a pel block that has been motion compensated using interframe encoding techniques. In particular, the inverse motion compensation unit 220 receives a motion vector 108 from the Huffman decoder 214. The motion vector 108 indicates a horizontal and vertical displacement between a target macroblock 100 being decoded and a reference macroblock 108 of a reference frame 104 (See. FIG. 1). In response to the received motion vector 108, the motion compensation unit 220 provides the adder 222 with an 8×8 prediction block of pels. The adder 222 then reconstructs a single 8×8 pel block of the target macroblock 100 according to the following equation: where x is the reconstructed 8×8 target block of pels, p is the 8×8 prediction block of pels, and e is the 8×8 prediction error block between the target block x and the prediction block p. Since the target macroblock 100 includes four 8×8 luminance (Y) blocks, one 8×8 first chrominance (Cb) block, and one 8×8 second chrominance (Cr) block, the inverse motion compensation unit 218 must provide the adder 222 with six corresponding 8×8 blocks of pels in order to reconstruct the target macroblock 100.

The spatial domain editing unit 206 is operable to receive the decoded video stream from the MPEG-2 decoder 204, and edit the decoded video stream using conventional spatial domain image manipulations. For example, the spatial domain editing unit 206 may be operable to perform spatial domain resizing, transcoding, and/or compositing operations upon the video stream in order to alter the visual appearance of frames of the video stream. Moreover, the MPEG-2 encoder 204 of the video editing system 200 is operable to receive the edited video stream, DCT encode the edited video stream, quantize the DCT encoded video stream, and Huffman encode the quantized DCT encoded video stream. Finally, the disk 202 is operable to receive and store the edited MPEG-2 video stream 212 from the MPEG-2 encoder 204.

Transform Domain Video Editing System of the Present Invention

It should be appreciated from the above description of the prior art video editing system 200 that MPEG-2 video editing in the spatial domain is computationally intensive due to the requirement of decompressing and recompressing the video stream. Since a large number of the decompressing and recompressing computations are directly related to transforming the video stream between the DCT domain and the spatial domain, a video editing system could eliminate a large number of computations by directly performing video editing in the DCT domain.

Figure 4:
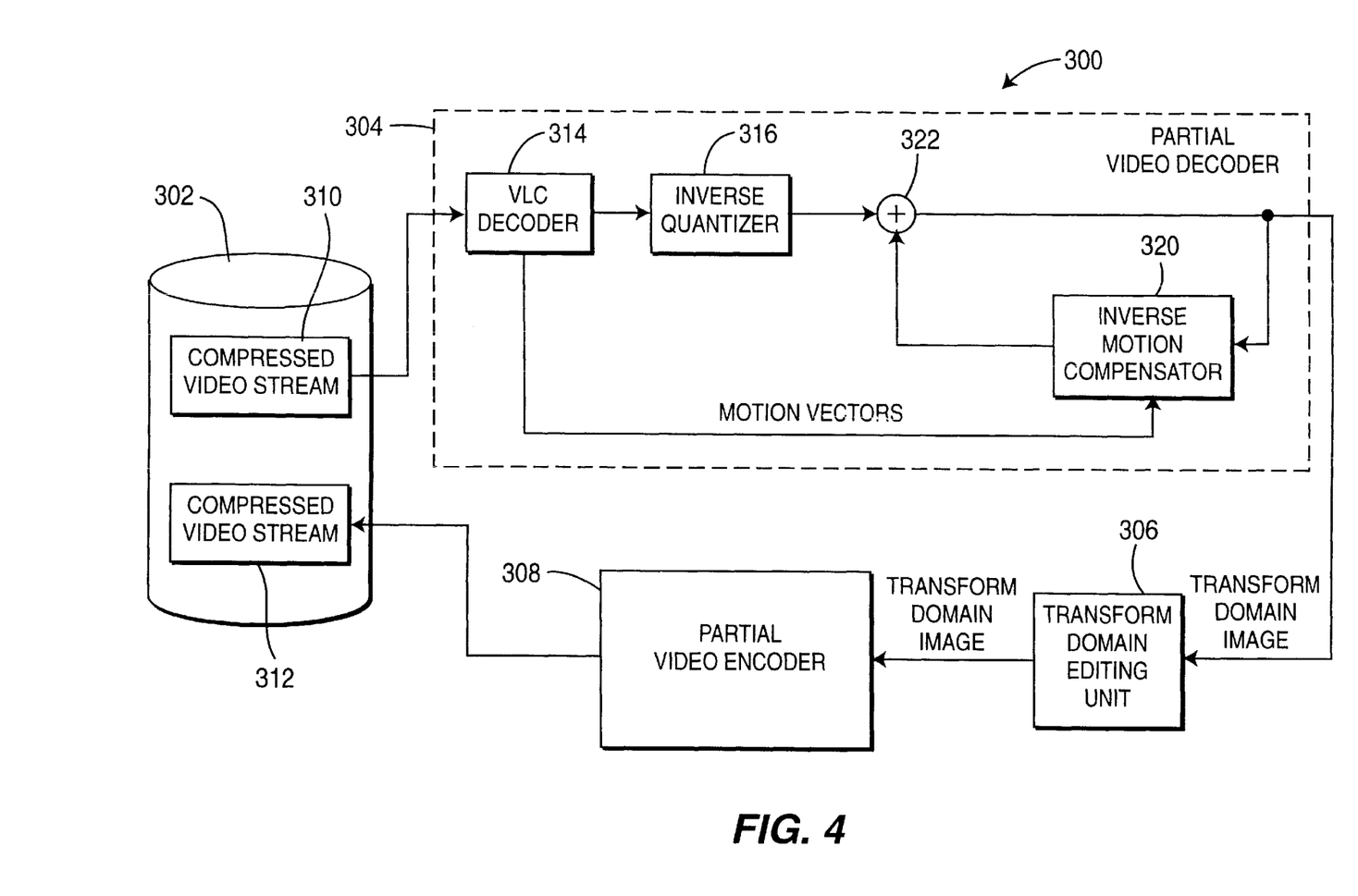
FIG. 4 shows a block diagram of a video editing system which edits a compressed video stream by performing image manipulation operations directly upon a transform domain representation of a video stream in accordance with features of the present invention.

FIG. 4. shows a video editing system 300 that incorporates the principles of the present invention. In particular, the video editing system 300, shown in FIG. 4, essentially performs video editing directly in the DCT domain, thus eliminating computations associated with transforming between the spatial domain and the DCT domain. Moreover, the video editing system 300 performs inverse motion compensation on a reference macroblock in the DCT domain with fractional pel accuracy. As depicted, the video editing system 300 includes a mass storage device 302, a partial video decoder 304, a transform domain editing unit 306, and a partial video encoder 308.

The mass storage device 302 of the video editing system 300 is operable to store digital information such as compressed video streams 310 and 312. Moreover, the mass storage device 302 may be implemented with various known storage devices such as hard drives, tape drives, CD-ROM drives, DVD drives, and RAID (redundant array of independent disks) devices. In order to simplify the following description of the video editing system 300, the video streams 310 and 312 stored on the mass storage device 302 are assumed to be video streams compressed in accordance with the MPEG-2 standard.

The partial video decoder 304 of the video editing system 300 is operable to receive an MPEG-2 video stream 310 from the mass storage device 302, and output a DCT domain representation of the video stream 310. Accordingly, for intraframe encoded blocks, the partial video decoder 304 is operable to extract from the MPEG-2 video stream 310, blocks of DCT coefficients that represent intraframe encoded pel blocks in the DCT domain. Moreover, for interframe encoded blocks, the partial video decoder 304 is operable to construct blocks of DCT coefficients that represent interframe encoded pel blocks in the DCT domain. To this end, the partial video decoder 304 is operable to perform inverse motion compensation on DCT encoded blocks in accordance with the following Equation:

$$X = P + E \qquad (6)$$

where X is an 8×8 block of DCT coefficients that represent the reconstructed 8×8 pel target block x in the DCT domain, P is an 8×8 block of DCT coefficients that represent the 8×8 pel prediction block p in the DCT domain, and E is an 8×8 block of DCT coefficients that represent the 8×8 pel prediction error block e in the DCT domain.

The transform domain editing unit 306 is operable to receive the 8×8 DCT blocks of the partially decoded MPEG-2 video stream from the partial video decoder 304, and edit the partially decoded MPEG-2 video stream by performing image manipulation operations directly upon the DCT blocks of the partially decoded MPEG-2 video stream. For example, the transform domain editing unit 306 may perform various transcoding, image resizing, and compositing operations directly upon the DCT blocks of the partially decoded MPEG-2 video stream. Image resizing directly in the DCT domain is disclosed in applicant's copending application entitled, Transform Domain Resizing Of An Image Compressed With Field Encoded Blocks, Ser. No. 09/162,377, filed Sep. 28, 1998 the disclosure of which is hereby incorporated by reference.

The partial video encoder 308 of the video editing system 300 is operable to receive the DCT blocks of the edited MPEG-2 video stream, quantize the received DCT blocks, and variable length encode the quantized DCT blocks in order to obtain an edited MPEG-2 video stream 312. Moreover, the disk 302 is operable to receive and store the edited compressed video stream 312. It should be appreciated that the partial video encoder 308 may further include a interframe encoding unit that is operable to interframe encode DCT frames in order to further compress the edited MPEG-2 video stream 312.

The partial video decoder 304 will now be discussed in further detail. As stated above, for intraframe encoded blocks, the partial video decoder 304 is operable to extract from the MPEG-2 video stream 310 DCT blocks that represent intraframe encoded pel blocks. To this end, the partial video decoder 304 includes a variable length decoder 314, such as a Huffman decoder, that is operable to variable length decode the MPEG-2 video stream 310 in order to obtain quantized DCT blocks from the compressed video stream 310. Moreover, the partial video decoder 304 includes an inverse quantizer 316 that is operable to receive and dequantize the quantized DCT blocks in order to obtain from the video stream 310 DCT blocks that represent intraframe encoded pel blocks.

Similarly, for interframe encoded blocks, the partial video decoder 304 is operable to construct a DCT block that represents a reconstructed pel target block in the DCT domain. To this end, the variable length decoder 314 of the partial video decoder 304 is further operable to variable length decode the compressed video stream 310 in order to obtain motion vectors and quantized DCT prediction error blocks. Moreover, the inverse quantizer 316 of the partial video decoder 304 is further operable to receive and dequantize the quantized DCT prediction error blocks in order to obtain DCT prediction error blocks from the MPEG-2 video stream 310.

The inverse motion compensation unit 320 is operable to construct a DCT prediction block P in the DCT domain based upon a DCT reference frame and a motion vector that indicates with fractional pel accuracy horizontal and vertical displacements between a pel prediction block p and a pel target block x. To this end, the inverse motion compensation unit 320 applies DCT vertical shifting and windowing matrices $V_k$ and DCT horizontal shifting and windowing matrices $H_k$ to DCT reference blocks $P_k$ in accordance with the following Equation:

$$P = \sum_{k=1}^{4} V_k R_k H_k \qquad (7)$$

where P is a matrix of DCT coefficients which represent the pel prediction block p in the DCT domain, $V_k$ is a matrix of DCT coefficients which represent a vertical integer pel shifting and windowing matrix $v_k$ in the DCT domain, and $H_k$ is a matrix of DCT coefficients which represent a horizontal integer pel shifting and windowing matrix $h_k$ in the DCT domain.

For intraframe encoded blocks, the adder 322 is operable to receive DCT encoded blocks of pels from the dequantizer 316, and pass the received DCT blocks though to the transform domain editing unit 306. For interframe encoded blocks, the adder 322 is operable to construct DCT target blocks X based upon DCT prediction blocks P and DCT prediction error blocks E. To this end, the adder 322 is operable to receive DCT prediction blocks P from inverse motion compensation unit 320, receive DCT prediction error blocks E from the dequantizer 316, and add the received DCT prediction blocks P to their corresponding prediction error block E in order to obtain DCT target blocks X.

Theory Behind Inverse Motion Compensation in the DCT Domain

The theory behind the operation of the inverse motion compensation unit 320 will be discussed in detail in order to better understand the operation of the video editing system 300 of the present invention. As stated previously, reconstruction of a pel target block in the spatial domain may be represented by the above Equation (5), which is presented again for convenience:

$$x = p + e \qquad (5)$$

where x is the reconstructed 8×8 target block of pels, p is the 8×8 prediction block of pels, and e is the 8×8 prediction error block representing the difference between the pel target block x and the pel prediction block p.

Due to the nature of the DCT transform, the spatial domain reconstruction Equation (5) may be represented in the DCT domain by the above Equation (6), which is also presented again for convenience:

$$X = P + E \qquad (6)$$

where X is an 8×8 block of DCT coefficients that represent the reconstructed 8×8 pel target block x in the DCT domain, P is an 8×8 block of DCT coefficients that represent the 8×8 pel prediction block p in the DCT domain, and E is an 8×8 block of DCT coefficients that represent the 8×8 pel prediction error block e in the DCT domain.

Figure 5:
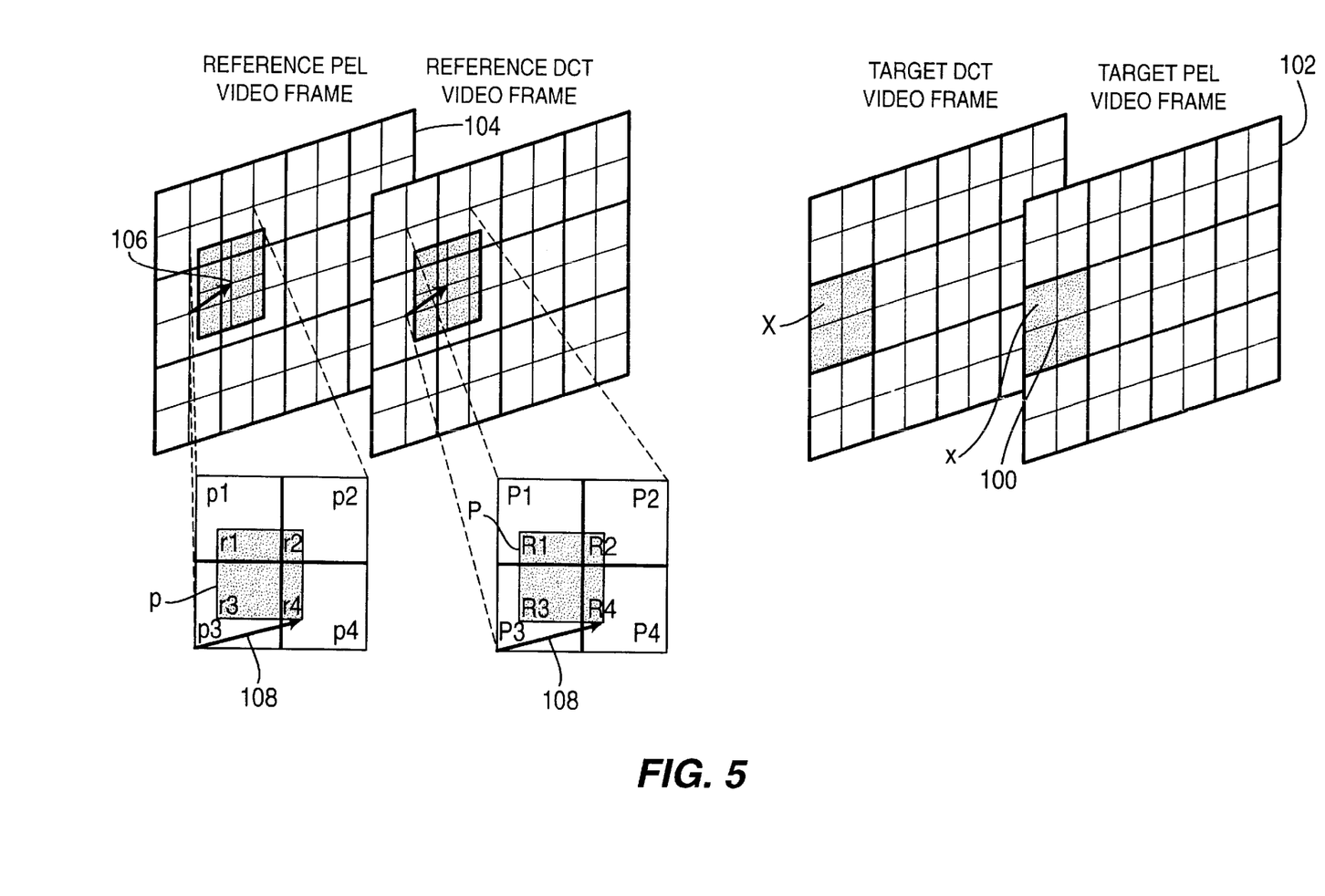
FIG. 5 illustrates a transform domain inverse motion compensation operation used by the video system of FIG. 4.

Since MPEG-2 interframe encoded video streams include DCT prediction error blocks E, the inverse motion compensation unit 320 must obtain DCT prediction blocks P in order to construct DCT target blocks X in accord with Equation (6). To this end, the inverse motion compensation unit 320 obtains the DCT prediction blocks P from DCT reference blocks of previously obtained DCT reference video frames. Shown in FIG. 5 is a DCT reference video frame 500 which represents the pel reference video frame 104 in the DCT domain. In particular, the reference video frame 500 comprises 8×8 reference blocks of DCT coefficients which represent in the DCT domain corresponding 8×8 reference blocks of pels of the reference video frame 104.

As stated previously, MPEG-2 interframe coding encodes a pel target macroblock 100 of a pel target video frame 102 by finding a pel prediction macroblock 106 in a pel reference video frame 104 that best matches the pel target macroblock 100 to be encoded. Since the pel prediction macroblock 106 and the pel target macroblock 100 may be displaced from each other by horizontal and vertical half-pel increments, each 8×8 pel prediction block p of the pel prediction macroblock 106 generally does not align exactly with an 8×8 pel reference block $p_k$ of the pel reference video frame 102. In general, the 8×8 pel prediction block p intersects four 8×8 reference blocks $p_1$, $p_2$, $p_3$, and $p_4$ of the pel reference video frame 104 as shown in FIG. 5.

The four 8×8 pel reference blocks $p_1$, $p_2$, $p_3$, and $p_4$ are respectively represented in the DCT reference video frame 500 by four 8×8 DCT reference blocks $P_1$, $P_2$, $P_3$, and $P_4$. Moreover, as stated above, the DCT prediction block P represents the pel prediction block p in the DCT domain. Accordingly, the goal of the inverse motion compensation unit 320 is to directly compute the DCT prediction block P from the four DCT reference blocks $P_1$, $P_2$, $P_3$, and $P_4$ which respectively correspond to the four pel reference blocks $p_1$, $p_2$, $p_3$, and $p_4$ intersected by the pel prediction block p.

As disclosed in the Merhav patent, ibid., S. F. Chang and D. G. Messerschmitt indicated that the pel prediction block p may be expressed as a superposition of appropriate windowed and shifted versions of the pel reference blocks $p_1$, $p_2$, $p_3$, and $p_4$ according to the equation:

$$p = \sum_{k=1}^{4} v_k p_k h_k \qquad (8)$$

where $v_k$ represents sparse 8×8 matrices of zeros and ones that defines a vertical integer pel shifting and windowing operation, and $h_k$ represents sparse 8×8 matrices of zeros and ones that defines a horizontal integer pel shifting and windowing operation.

Moreover, as illustrated in FIG. 5, Chang and Messerschmitt defined pel rectangles $r_1$, $r_2$, $r_3$, and $r_4$ as the intersection of the pel prediction block p with the pel reference blocks $p_1$, $p_2$, $p_3$, and $p_4$, respectively. Specifically, Chang and Messerschmitt defined each pel rectangle $r_k$ as having integer pel dimensions $a_k \times b_k$, where $0 \leq a_{k \leq N} - 1$ for $1 \leq k \leq 4$, and $0 \leq b_k \leq N-1$ for $1 \leq k \leq 4$. Assuming that the intersection of the pel prediction block p with the pel reference block $p_1$ defines an a×b integer pel rectangle $r_1$ as shown in FIG. 5, then:

$$a_1=a_2=a \quad (9.1)$$

$$a_3=a_4=N-a \quad (9.2)$$

$$b_1=b_3=b \quad (9.3)$$

$$b_2=b_4=N-b \quad (9.4)$$

In reference to the above definitions of the pel dimensions $a_k$ and $b_k$, Chang and Messerschmitt defined the vertical integer pel shifting and windowing matrices $v_k$, and the horizontal integer pel shifting and windowing matrices $h_k$ in the following manner:

$$v_1=v_2=U(a) \quad (10.1)$$

$$v_3=v_4=U(N-a) \quad (10.2)$$

$$h_1=h_3=L(b) \quad (10.3)$$

$$h_2=h_4=L(N-b) \quad (10.4)$$

where $U(n)$ and $L(n)$ are N×N integer shifting and windowing matrices defined by the following equations:

$$U(n) = \begin{bmatrix} 0 & I_n \\ 0 & 0 \end{bmatrix} \quad (11.1)$$

$$L(n) = \begin{bmatrix} 0 & 0 \\ I_n & 0 \end{bmatrix} \quad (11.2)$$

It should be appreciated that (i) $I_n$ represents the n×n identity matrix, (ii) $U(N)=L(N)=I_N$, where $I_N$ represents the N×N identity matrix, and (iii) $U(0)=L(0)=O_N$, where $O_N$ represents an N×N matrix of zeros.

The basic idea behind the work of Chang and Messerschmitt is to use the distributive property of matrix multiplication with respect to the DCT. Specifically, because $S^tS=I$, where I represents the identity matrix, Equation (8) may be rewritten as follows:

$$p = \sum_{k=1}^{4} v_k S^t S p_k S^t S h_k \quad (12)$$

where S represents the DCT matrix defined by Equation (3), and $S^t$ represents the transposition of the DCT matrix S. Next, by premultiplying both sides of Equation (11) by S, and postmultiplying by $S^t$, the following equation is obtained:

$$SpS^t = \sum_{k=1}^{4} Sv_k S^t S p_k S^t S h_k S^t \quad (13)$$

Applying Equation (2), Equation (13) may be rewritten in order to obtain above Equation (7) which presented again:

$$P = \sum_{k=1}^{4} V_k P_k H_k \quad (7)$$

where P is a matrix of DCT coefficients which represent the pel prediction block p in the DCT domain, $V_k$ is a matrix of DCT coefficients which represent a vertical integer pel shifting and windowing matrix $v_k$ in the DCT domain, and $H_k$ is a matrix of DCT coefficients which represent a horizontal integer pel shifting and windowing matrix $h_k$ in the DCT domain.

Chang and Messerschmitt proposed precomputing the fixed DCT vertical shifting and windowing matrices $V_k$, precomputing the fixed DCT horizontal shifting and windowing matrices $H_k$, and computing the DCT prediction block P directly in the DCT domain using Equation (7). In other words for each possible pel vertical integer shifting and windowing matrix $v_k$ defined by Equations (10.1) and (10.2), a DCT vertical integer shifting and windowing matrix $V_k$ is precalculated by converting the corresponding vertical shifting matrix $v_k$ to the DCT domain in accord with Equation (1). Similarly, for each possible pel horizontal integer shifting and windowing matrix $h_k$ defined by Equations (10.3) and (10.4), a DCT horizontal integer shifting and windowing matrix $H_k$ is precalculated by converting the corresponding horizontal shifting matrix $h_k$ to the DCT domain in accord with Equation (1).

While the Chang and Messerschmitt method eliminates the need to perform inverse DCT calculations, the Chang and Messerschmitt method only inverse motion compensates with integer pel accuracy. In other words, Chang and Messerschmitt only disclose integer pel displacements between the pel prediction block p and the pel target block x to be constructed. Since MPEG-2 interframe encoding utilizes motion vectors indicative of half pel displacement in both the vertical and horizontal direction, Chang and Messerschmitt's method when used with MPEG-2 video streams introduces undesirable artifacts into constructed DCT target blocks X due to failing to account for fractional pel displacement.

Referring back to FIG. 5, each pel rectangle $r_k$ is redefined as having pel dimensions $a_k \times b_k$ of fractional pel accuracy. In particular, since MPEG-2 interframe encoding utilizes motion vectors having half-pel accuracy (i.e. half-pel displacement increments), then each pet dimension $a_k$ and $b_k$ of the pet rectangles $r_k$ is either an integer or an integer plus a half (0.5). Accordingly, the pel dimension $a_k$ and the pel dimension $b_k$ can be represented as follows:

$$a_k = \lfloor a_k \rfloor + (a_k - \lfloor a_k \rfloor) \quad (14.1)$$

$$b_k = \lfloor b_k \rfloor + (b_k - \lfloor b_k \rfloor) \quad (14.2)$$

where $\lfloor \cdot \rfloor$ represents the floor operation. To easily distinguish between the integer and fractional portion of the pel dimensions $a_k$ and $b_k$, the integer function $i(\cdot)$ of dimensional d and remainder function $r(\cdot)$ of dimension d are defined as follows:

$$i(d) = \lfloor d \rfloor \quad (15)$$

$$r(d) = d - \lfloor d \rfloor \quad (16)$$

Since MPEG-2 motion vectors have half-pel accuracy, the integer function $i(\cdot)$ for $d=a_k$ returns an integer equal to the integer portion of the pel dimension $a_k$, and the remainder function $r(\cdot)$ for $d=a_k$ returns the fractional portion of the pet dimension $a_k$ which is either 0 or 0.5. Similarly, the integer function $i(\cdot)$ for $d=b_k$ returns an integer equal to the integer portion of the pel dimension $b_k$, and the remainder function $r(\cdot)$ for $d=b_k$ returns the fractional portion of the pet dimension $b_k$ which is either 0 or 0.5.

For the shifting and windowing operations with half-pel accuracy, new shifting and windowing matrices $U^+(n)$ and $L^+(n)$ are defined as follows:

$$U^+(n)=^{1/2}(U(n)+U(n+1)) \quad (17.1)$$

$$L^+(n)=^{1/2}(L(n)+L(n+1)) \quad (17.2)$$

where n is an integer. It should be appreciated that the new shifting and windowing matrix $U^+(n)$ is essentially interpolated from the integer shifting and windowing matrix $U(n)$ and the integer shifting and windowing matrix $U(n+1)$ as defined by Equation (11.1). Similarly, the new shifting and windowing matrix $L^+(n)$ is essentially interpolated from the integer shifting and windowing matrix $L(n)$ and the integer shifting and windowing matrix the $L(n+1)$ as defined by Equation (11.2).

Assuming that the intersection of the pel prediction block p with the pel reference block $p_1$ defines a pel rectangle $r_1$ having pel dimensions a×b as shown in FIG. 5, then pel vertical shifting and windowing matrices $v_k$ are defined by above Equations (10.1) and (10.2), if r(a) is equal to 0. In other words, the pel vertical shifting and windowing matrices $v_k$ are defined in the same manner as the Chang and Messerschmitt method if the pel dimension a is an integer. However, if r(a) is equal to 0.5, then the pel dimensions $a_k$ are defined as follows:

$$a_1=a_2=a=i(a)+0.5 \quad (18.1)$$

$$a_3=a_4=N-a=(N-1-i(a))+0.5 \quad (18.2)$$

In reference to the above definitions of the pel dimension $a_k$, the new vertical shifting and windowing matrices $v_k$ are defined in terms of the new shifting and windowing matrices $U^+(n)$ and $L^+(n)$ as follows:

$$v_1=v_2=U^+(i(a)) \quad (19.1)$$

$$v_3=v_4=L^+(N-1-i(a)) \quad (19.2)$$

Similarly, the horizontal shifting and windowing matrices $h_k$ are defined by above Equations (10.3) and (10.4), if r(b) is equal to 0. In other words, the horizontal shifting and windowing matrices $h_k$ are defined in the same manner as the Chang and Messerschmitt method if the pel dimension b is an integer. However, if the remainder function r(b) is equal to 0.5, then the pel dimensions $b_k$ are defined as follows:

$$b_1=b_3=b=i(b)+0.5 \quad (20.1)$$

$$b_2=b_4=N-b=(N-1-i(b))+0.5 \quad (20.2)$$

In reference to the above definitions of the pel dimensions $b_k$, the new horizontal shifting and windowing matrices $h_k$ are defined in terms of the new shifting matrices $U^+(n)$ and $L^+(n)$ as follows:

$$h_1=h_3=L^+(i(b)) \quad (21.1)$$

$$h_2=h_4=U^+(N-1-i(b)) \quad (21.2)$$

Similar to the Chang and Messerschmitt method, the DCT fractional pel vertical shifting and windowing matrices $V_k$, and the DCT horizontal shifting and windowing matrices $H_k$ may be precomputed for use in computing the DCT prediction block P directly in the DCT domain using Equation (7). In other words for each possible pel vertical fractional shifting and windowing matrix $v_k$ defined by Equations (19.1) and (19.2), a DCT vertical fractional shifting and windowing matrix $V_k$ may be precalculated by converting the corresponding vertical shifting matrix $v_k$ to the DCT domain in accord with Equation (1). Similarly, for each possible pel horizontal fractional shifting and windowing matrix $h_k$ defined by Equations (21.1) and (21.2), a DCT horizontal fractional shifting and windowing matrix $H_k$ may be precalculated by converting the corresponding horizontal shifting matrix $h_k$ to the DCT domain in accord with Equation (1).

A DCT prediction block P then may be constructed in the DCT domain in accord with the following:

$$P = \sum_{k=1}^{4} V_k P_k H_k \quad (22)$$

where P is a matrix of DCT coefficients which represent the pel prediction block p in the DCT domain; $V_k$ is a matrix of DCT coefficients which represent in the DCT domain either (i) a vertical integer pel shifting and windowing matrix $v_k$, or (ii) a vertical fractional pel shifting and windowing matrix $v_k$; and $H_k$ is a matrix of DCT coefficients which represent in the DCT domain (i) either a horizontal integer pel shifting and windowing matrix $h_k$, or (ii) a horizontal fractional pel shifting and windowing matrix $h_k$.

Operation of the Transform Domain Video Editing System of the Present Invention

Figure 6:
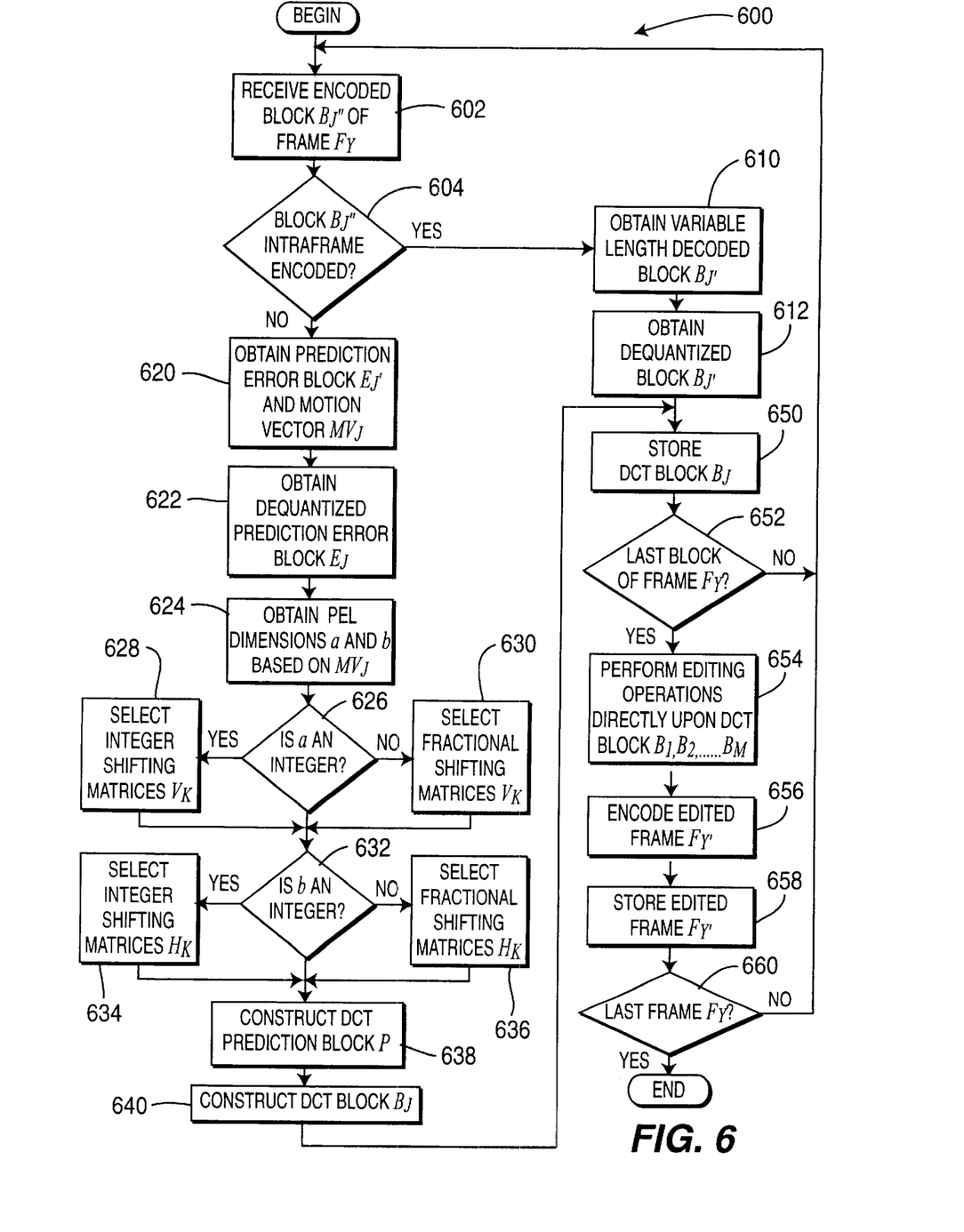
FIG. 6 shows an operational flowchart of the video editing system of FIG. 4 that performs a transform domain inverse motion compensation operation with fractional pel accuracy.

A flow chart 600 illustrating the operation of the video editing system 300 is shown in FIG. 6. In particular, the flow chart 600 illustrates how the video editing system is 300 obtains the edited compressed video stream 312 from the compressed video stream 310, where the compressed video stream 310 comprises a sequence of intraframe and interframe encoded video frames $F_1, F_2, \ldots, F_z$ that each comprise a plurality of encoded blocks $B_1", B_2", \ldots, B_M"$.

First, the partial video decoder 304 in step 602 receives an encoded block $B_J"$ of a video frame $F_Y$. The partial video decoder 304 in step 604 determines whether the encoded block $B_J"$ was intraframe encoded or interframe encoded. To this end, the partial video decoder 304 makes this determination based upon information included in a macroblock header of an encoded macroblock.

If the encoded block $B_J"$ was intraframe encoded, then the partial video decoder 304 does not need to perform inverse motion compensation in order to obtain a DCT block $B_J$ of DCT coefficients that represent a corresponding pel block $b_J$ in the DCT domain. Accordingly, the partial video decoder 304 variable length decodes in step 610 the encoded block $B_J"$ to obtain a variable length decoded block $B_J'$. Then in step 612, the partial video decoder 304 dequantizes the variable length decoded block $B_J'$ to obtain a DCT block $B_J$ that represents a corresponding pel block $b_J$ in the DCT domain.

If the encoded block $B_J"$ was interframe encoded, however, then the partial video decoder 304 needs to perform inverse motion compensation in order to obtain a DCT block $B_J$ of DCT coefficients that represent a corresponding pel block $b_J$ in the DCT domain. Accordingly, the partial video decoder 304 variable length decodes in step 620 the encoded block $B_J"$ to obtain (i) a variable length decoded prediction error block $E_J'$, and (ii) a motion vector $mv_J$ that indicates a vertical pel displacement $pd_v$ and a horizontal pel displacement $pd_H$. Then in step 622, the partial video decoder 304 dequantizes the variable length decoded prediction error block $E_J'$ to obtain a DCT prediction error block $E_J$ that represents a pel prediction error block e between a pel target block x and a pel prediction block p in the DCT domain.

The inverse motion compensation unit 320 then in step 624 determines based upon the vertical pel displacement $pd_v$ and the horizontal pel displacement $pd_H$, the pel dimensions a and b corresponding to the intersection between the pel prediction block p and the pel reference block $p_1$ as depicted in FIG. 5. After obtaining pel dimensions a and b, the inverse motion compensation unit 320 in step 626 determines whether pel dimension a indicates an integer pel offset or a fraction pel offset. In particular, the inverse motion compensation unit 320 determines whether the remainder r(a) is equal to 0. See above Equation (16) that defines the remainder function r(·).

If the inverse motion compensation unit 320 determines that pel dimension a indicates an integer pel offset, then the inverse motion compensation unit 320 in step 628 selects appropriate DCT vertical shifting and windowing matrices $V_k$ that have been precomputed based upon the vertical integer shifting and windowing matrices $v_k$ defined in Equations (10.1) and (10.2). On the other hand, if the inverse motion compensation unit 320 determines that the pel dimension a indicates a fractional pel offset, then the inverse motion compensation unit 320 in step 630 selects appropriate DCT vertical shifting and windowing matrices $V_k$ that have been precomputed based upon the above the vertical fractional shifting and windowing matrices $v_k$ defined in Equations (19.1) and (19.2).

Similarly, the inverse motion compensation unit 320 in step 632 determines whether pel dimension b indicates an integer pel offset or a fraction pel offset. In particular, the inverse motion compensation unit 320 determines whether the remainder r(b) is equal to 0.

If the inverse motion compensation unit 320 determines that pel dimension b indicates an integer pel offset, then the inverse motion compensation unit 320 selects in step 634 appropriate DCT horizontal shifting matrices $H_k$ that have been precomputed based upon the horizontal integer shifting and windowing matrices $h_k$ defined in Equations (10.3) and (10.4). On the other hand, if the inverse motion compensation unit 320 determines that the pel dimension b indicates a fractional pel offset, then the inverse motion compensation unit 320 selects in step 636 appropriate DCT horizontal shifting and windowing matrices $H_k$ that have been precomputed based upon the horizontal fractional shifting and windowing matrices $h_k$ defined in Equations (21.1) and (21.2).

After selecting the appropriate DCT shifting and windowing matrices $V_k$ and $H_k$, the inverse motion compensation unit 320 constructs a DCT prediction block P by applying the DCT vertical shifting and windowing matrices $V_k$ and the DCT horizontal shifting and windowing matrices $H_k$ to appropriate DCT reference blocks $P_k$ of the DCT reference frame $F_{Y-1}$. In particular, the inverse motion compensation unit 320 constructs the DCT prediction block P based upon above Equation (22). The adder 322, then in step 640, constructs a DCT block $B_J$ based upon the constructed DCT prediction block P and the DCT prediction error block E. In particular, the adder 322 adds the constructed DCT prediction block P to the DCT prediction error block E in order to obtain the DCT block $B_J$ that represents a corresponding pel block $b_J$ in the DCT domain.

After the partial video decoder 304 obtains the DCT block $B_J$, the partial video decoder 304 then in step 650 stores the DCT block $B_J$ of the video frame $F_Y$ in order to provide reference DCT blocks $P_k$ for future inverse motion compensation operations. Moreover, by storing the DCT block $B_J$ the transform domain editing unit 306 may later edit the video stream by performing video editing operations directly upon the DCT block $B_J$.

The partial video decoder 304 then in step 652 determines whether the encoded block $B_J''$ was the last block of the video frame $F_Y$. If the partial video decoder determines that the encoded block $B_J''$ was the last block of the video frame $F_Y$, then video editing system proceeds to step 654. However, if the partial video decoder 304 determines that the encoded block $B_J''$ was not the last block of the video frame $F_Y$, then the partial video decoder 304 returns to step 602 in order to receive the next encoded block $B_{J+1}''$ of the video frame $F_Y$.

In step 654, the transform domain editing unit 306 edits the video frame $F_Y$ to obtain an edited video frame $F_Y'$ by performing image manipulation operations directly upon the DCT blocks $B_1, B_2, \ldots, B_M$ that represent the video frame $F_Y$. Video editing in the DCT domain is well known. (See, U.S. Pat. No. 5,708,732 to Merhav et al which discloses downsampling N×M video frames in the DCT domain in order to obtain video frames having N/2×M/2 spatial resolution. Also see, S. F. Chang and Messerschmitt, *A New Approach To Decoding And Compositing Motion-Compensated DCT-Based Images*, International Conference Acoustics, Speech, and Signal Processing, pp V421–424 (1993), which introduces the concept of compositing in the DCT domain.)

The edited video frame $F_Y'$ is then encoded by the partial video encoder 308 in step 656, and stored upon the mass storage device 302 in step 658.

Then, in step 660, the video editing system 300 determines whether the video frame $F_Y$ was the last video frame $F_Z$ of the compressed video stream 310. If the video frame $F_Y$ was not the last video frame $F_Z$ of the compressed video stream 310, then the video editing system 300 returns to step 602 in order to receive encoded block $B_1$ of the next encoded video frame $F_{Y+1}$. Otherwise, if the video frame $F_Y$ was the last video frame $F_Z$, then the video editing system 300 stops processing the compressed video stream 310 since the video editing system 300 has obtained the compressed video stream 312 that represents an edited version of the compressed video stream 310.

Figure 7:
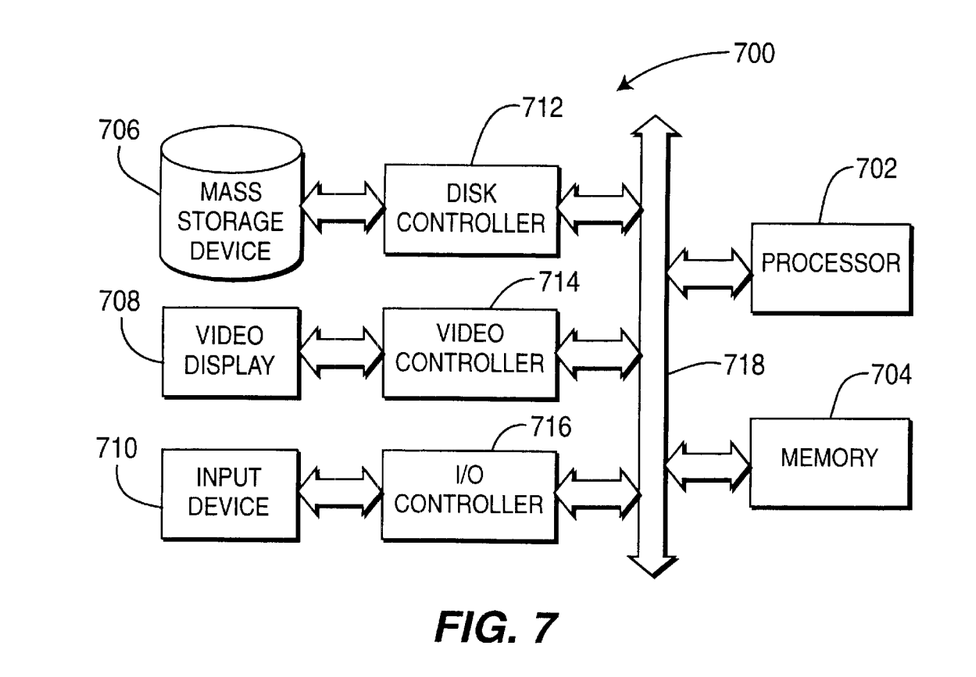
FIG. 7 shows a general processing system suitable for implementing the video editing system of FIG. 4.

Implementation of the Transform Domain Video Editing System of the Present Invention It should be appreciated that the blocks of the video editing system 300 may be implemented with various hardware components such a digital signal processors, digital logic components, and analog components. Moreover, it should be appreciated that blocks of the video editing system 300 may be implemented with properly programmed general processors. For example, FIG. 7 illustrates a general processing system 700 which is suitable for implementing the video editing system 300 of the present invention. In particular, the general processing system 700 includes a processor 702, memory 704, mass storage device 706, video display 708, and input device 710. Moreover, the general processing system 700 includes a disk controller 712 for controlling the mass storage device 706, a video controller 714 for controlling the video display 708, an I/O controller 716 for controlling the input device 710, and a system bus 718. The system bus 718 operably couples the processor 702 to the memory 704, the disk controller 712, the video controller 716, and the I/O controller 718.

The memory 704 includes random access memory (RAM) such as SRAM (static RAM), DRAM (dynamic RAM), and SDRAM (synchronous DRAM) which store software routines obtained from computer readable medium such as a floppy disk, CD-ROM disc, DVD disc, and hard disks. The memory 704 may also include nonvolatile computer readable medium such as PROM (programmable read only memory), EPROM (electrically PROM), EEPROM (electrically erasable PROM), and flash memory that store software routines. In particular, the memory 704 stores software routines which, when executed by the processor 702, cause the processor 702 to edit video streams stored on the mass storage device 706 in the DCT domain.

The processor 702 is operable to execute the software routines stored in the memory 704, and communicate with the mass storage device 706, the video display 708, and the input device 710 via the disk controller 712, the video controller 716, and the I/O controller 718, respectively. Most importantly, the processor 702 is operable to execute software routines of the memory 702 which cause the processor 702 to inverse motion compensate blocks of a video stream in the DCT domain with fractional pel accuracy.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected.

For example, while the present invention has been described in reference to editing MPEG-2 video streams, features of the present invention may also be applied to editing and decoding video streams that have been compressed in accord to other video compression standards. Moreover, features of the present invention may be applied to editing video streams that are transformed using other transformations such as the discrete sine transform (DST), and the Hadamard transform. Furthermore, while the present invention has been described in reference to editing MPEG-2 video streams which utilize motion vectors having half pel accuracy, features of the present invention may be extended to editing video streams which utilize motion vectors having a different pel accuracy such as quarter pel accuracy.

What is claimed is:

1. A method of inverse motion compensating in a transform domain with fractional pel accuracy, comprising the steps of:
   (A) obtaining first and second fractional pel displacements between a pel target block of a target frame and a pel prediction block of a reference frame; and
   (B) selecting a first DCT shifting matrix that when applied to a transform domain reference block shifts said transform domain reference block by a first fractional pel amount that is based upon said first fractional pel displacement,
   (C) selecting a second DCT shifting matrix that when applied to said transform domain reference block shifts said transform domain reference block by a second pel amount that is based upon said second pel displacement, and
   (D) applying said first DCT shifting matrix and said second DCT shifting matrix to said transform domain reference block in order to obtain a first portion of said transform domain prediction block.

2. The method of claim 1, wherein:
   said selecting step (B) comprises the step of selecting said first DCT shifting matrix based upon a first fractional pel shifting and windowing matrix that has been interpolated from a first plurality of integer pel shifting and windowing matrices, and
   said selecting step (C) comprises the step of selecting said second DCT shifting matrix based upon a second fractional pel shifting and windowing matrix that has been interpolated from a first plurality of integer pel shifting and windowing matrices.

3. The method of claim 1, wherein:
   said selecting step (B) comprises the step of selecting said first DCT shifting matrix based upon a first fractional pel shifting and windowing matrix $U^+(n)$,
   said selecting step (C) comprises the step of selecting said second DCT shifting matrix based upon a second fractional pel shifting and windowing matrix $L^+(m)$,
   said first fractional pel shifting and windowing matrix $U^+(n)$ is defined by $$U^+(n) = \tfrac{1}{2}(U(n)+U(n+1)),$$

$U(n)$ is a first integer pel shifting and windowing matrix defined by $$U(n) = \begin{bmatrix} 0 & I_n \\ 0 & 0 \end{bmatrix},$$

n is an integer based upon said first fractional pel displacement,
   $I_n$ represents an n×n identity matrix,
   said second fractional pel shifting and windowing matrix $L^+(m)$ is defined by $$L^+(m) = \tfrac{1}{2}(L(m)+L(m+1)),$$

$L(m)$ is a second integer pel shifting and windowing matrix defined by $$L(m) = \begin{bmatrix} 0 & 0 \\ I_m & 0 \end{bmatrix},$$

m is an integer based upon said second fractional pel displacement, and
   $I_m$ represents an m×m identity matrix.

4. A method of constructing a transform domain target block, comprising the steps of:
   (A) obtaining a first displacement value;
   (B) determining whether said first displacement value indicates a first fractional pet displacement between a pel target block of a target frame and a pel prediction block of a reference frame;
   (C) constructing a transform domain prediction block in said transform domain based upon a transform domain representation of said reference frame, wherein said constructing step (C) comprises the step of:
   (C1) selecting a first DCT shifting matrix that when applied to a transform domain reference block shifts said transform domain by said first fractional pel amount, and
   (C2) applying said first DCT shifting matrix to said transform domain reference block in order shift said transform domain by said first fractional pel amount; and
   (D) constructing said transform domain target block based upon said transform domain prediction block and a transform domain prediction error block that represents a pel difference between said pel target block and said pel prediction block.

5. The method of claim 4, wherein said constructing step (C) further comprises the step of:
   (C3) shifting said transform domain reference block by a first integer pel amount that is based upon said first displacement value, if said determining step (B) determines that said first displacement value does not indicate said first fractional pel displacement.

6. The method of claim 5, wherein:

said shifting step (C3) further comprises the steps of selecting a second DCT shifting matrix that when applied to said transform domain reference block shifts said transform domain reference block by said first integer pel amount, and applying said second DCT shifting matrix to said transform domain reference block in order shift said transform domain reference block by said first integer pel amount.

7. The method of claim 4, further comprising the step of (E) obtaining a second fractional pel displacement between said pel target block and said pel prediction block, wherein:

said constructing step (C) further comprises the steps of (C3)

selecting a second DCT shifting matrix that when applied to said transform domain reference block shifts said transform domain reference block by a second fractional pel amount that is based upon said second fractional pel displacement, and said shifting step (C1) further comprises the steps of (C1a) selecting a first DCT shifting matrix that when applied to a transform domain reference block shifts said transform domain by said first fractional pel amount, and (C1b) applying said first DCT shifting matrix and said second DCT shifting matrix to said transform domain reference block in order to obtain a first portion of said transform domain prediction block.

8. The method of claim 7, wherein:

said selecting step (C1a) comprises the step of selecting said first DCT shifting matrix based upon a first fractional pel shifting and windowing matrix that has been interpolated from a plurality of integer pel shifting and windowing matrices, and said selecting step (C3) comprises the step of selecting said second DCT shifting matrix based upon a second fractional pel shifting and windowing matrix that has been interpolated from a plurality of integer pel shifting and windowing matrices.

9. The method of claim 7, wherein:

said selecting step (C1a) comprises the step of selecting said first DCT shifting matrix based upon a first fractional pel shifting and windowing matrix $U^+(n)$, said selecting step (C3) comprises the step of selecting said second DCT shifting matrix based upon a second fractional pel shifting and windowing matrix $L^+(m)$, said first fractional pel shifting and windowing matrix $U^+(n)$ is defined by $$U^{30}(n) = \tfrac{1}{2}(U(n)+U(n+1)),$$

$U(n)$ is a first integer pel shifting and windowing matrix defined by $$U(n) = \begin{bmatrix} 0 & I_n \\ 0 & 0 \end{bmatrix},$$

n is an integer based upon said first fractional pel displacement, $I_n$ represents an n×n identity matrix, said second fractional pel shifting and windowing matrix $L^+(m)$ is defined by $$L^+(m) = \tfrac{1}{2}(L(m)+L(m+1)),$$

$L(m)$ is a second integer pel shifting and windowing matrix defined by $$L(m) = \begin{bmatrix} 0 & 0 \\ I_m & 0 \end{bmatrix},$$

m is an integer based upon said second fractional pel displacement, and $I_m$ represents an m×m identity matrix.

10. A computer readable medium for configuring a processor to inverse motion compensate in a transform domain with fractional pel accuracy, comprising a plurality of instruction which when executed by said processor cause said processor to:

(A) obtain a first fraction pel displacement between a pel target block and a pel prediction block of a reference frame;

(B) obtain a second fractional pel displacement between said pel target block and said pel prediction block;

(C) select a first DCT shifting matrix that when applied to a transform domain reference block shifts said transform domain by a first fractional pel amount based upon said first fractional pel displacement;

(D) select a second DCT shifting matrix that when applied to said transform domain reference block shifts said transform domain by a second fractional pel amount based upon said second pel displacement, and (E) apply said first DCT shifting matrix and said second DCT shifting matrix to said transform domain reference block in order to obtain a first portion of said transform domain prediction block.

11. The computer readable medium of claim 10, wherein:

said first DCT shifting matrix is based upon a first fractional pel shifting and windowing matrix $U^+(n)$, said second DCT shifting matrix is based upon a second fractional pel shifting and windowing matrix $L^+(m)$, said first fractional pel shifting and windowing matrix $U^+(n)$ is defined by $$U^+(n) = \tfrac{1}{2}(U(n)+U(n+1)),$$

$U(n)$ is a first integer pel shifting and windowing matrix defined by $$U(n) = \begin{bmatrix} 0 & I_n \\ 0 & 0 \end{bmatrix},$$

n is an integer based upon said first fractional pel displacement, $I_n$ represents an n×n identity matrix, said second fractional pel shifting and windowing matrix $L^+(m)$ is defined by $$L^+(m) = \tfrac{1}{2}(L(m)+L(m+1)),$$

$L(m)$ is a second integer pel shifting and windowing matrix defined by $$L(m) = \begin{bmatrix} 0 & 0 \\ I_m & 0 \end{bmatrix},$$

m is an integer based upon said second fractional pel displacement, and $I_m$ represents an m×m identity matrix.

12. A video editing system for editing a video stream in a transform domain, comprising:

a mass storage device that is operable to store compressed video streams;

a partial video decoder coupled to said mass storage device, said partial video decoder operable to (i) receive a first compressed video stream from said mass storage unit, and (ii) partially decode said first compressed video stream in order to obtain a transform domain video stream.

an editing unit coupled to said partial video decoder, said editing unit operable to perform image manipulation operations upon said transform domain video stream to obtain a transform domain edited video stream; and a partial video encoder coupled to said editing unit, said partial video encoder operable to (i) receive said transform domain edited video stream, (ii) encode said transform domain edited video stream to obtain a compressed edited video stream to store upon said mass storage device, wherein: said partial video encoder is further operable to apply a first DCT shifting matrix, based upon a first fractional pel amount of resolution finer than one pel spacing, to said transform domain reference block to shift said transform domain reference block by said first fractional pel amount, and (vi) apply a second DCT shifting matrix, based upon a second fraction pel amount, to said transform domain reference block in order to shift said transform domain reference block by said second fractional pel amount, and wherein said partial video decoder is further operable to (iii) shift a transform domain reference block of said transform domain video stream by fractional pel amounts to obtain a transform domain prediction block, and (iv) construct a transform domain target block of said transform domain video stream based upon said transform domain prediction block and a transform domain prediction error block.

13. The video editing system of claim 12, wherein:

said partial video encoder is further operable to (v) obtain a first pel displacement value from said video stream that indicates a first pel displacement between said transform domain prediction block and said transform domain target block, (vi) if said first pel displacement value indicates that said transform domain reference block needs to be shifted by a first fractional pel amount, select a first DCT shifting matrix that when applied to said transform domain reference block shifts said transform domain reference block by said first fractional pel amount, and (vii) apply said first DCT shifting matrix to said transform domain reference block.

\* \* \* \* \*

UNITED STATES PATENT AND TRADEMARK OFFICE
CERTIFICATE OF CORRECTION

PATENT NO. : 6,452,969 B1  
DATED : September 17, 2002  
INVENTOR(S) : Changhoon Yim It is certified that error appears in the above-identified patent and that said Letters Patent is hereby corrected as shown below:

Column 19,
Line 55, "$U^{30}(n) \equiv 1/2(U(n)+U(n+1))$," should read -- $U^+(n) \equiv 1/2(U(n)+U(n+1))$, --.

Signed and Sealed this

Eighteenth Day of February, 2003

JAMES E. ROGAN
*Director of the United States Patent and Trademark Office*